W. C. WAITE.
SPRAYING DEVICE.
APPLICATION FILED AUG. 6, 1920.

1,373,372.

Patented Mar. 29, 1921.

W. C. Waite INVENTOR

BY *Victor J. Evans*

ATTORNEY

WITNESSES

UNITED STATES PATENT OFFICE.

WARREN C. WAITE, OF DOWNING, WISCONSIN.

SPRAYING DEVICE.

1,373,372.  Specification of Letters Patent.  Patented Mar. 29, 1921.

Application filed August 6, 1920. Serial No. 401,814.

*To all whom it may concern:*

Be it known that I, WARREN C. WAITE, a citizen of the United States, residing at Downing, in the county of Dunn and State of Wisconsin, have invented new and useful Improvements in Spraying Devices, of which the following is a specification.

This invention comprehends the provision of a spraying device designed for use, producing sprays for liquids in carrying out the well known process of extracting solid constituents of liquid, which is done by converting the liquid into a fine spray and bringing the spray into contact with a heated air so that the liquid constituents are completely vaporized and the dry or solid constituents conveyed to a receptacle.

The chief characteristic of the present invention resides in the provision of a novel construction of spraying device, by means of which the volume, fineness and direction of the spray may be readily controlled and obtained.

The nature and advantages of the invention will be better understood when the following detail description is read in connection with the accompanying drawings, the invention residing in the construction, combination and arrangement of parts as claimed.

In the drawing forming part of this application like numerals of reference indicate similar parts in the several views and wherein.

Figure 1:
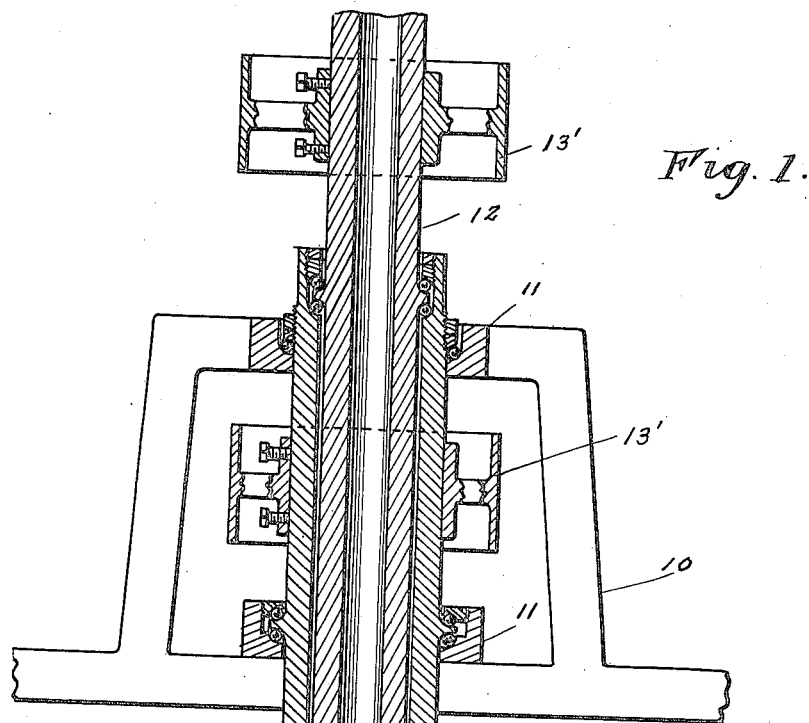
Figure 1 is a vertical sectional view taken through the spraying device forming the subject matter of my invention.
Figure 2:
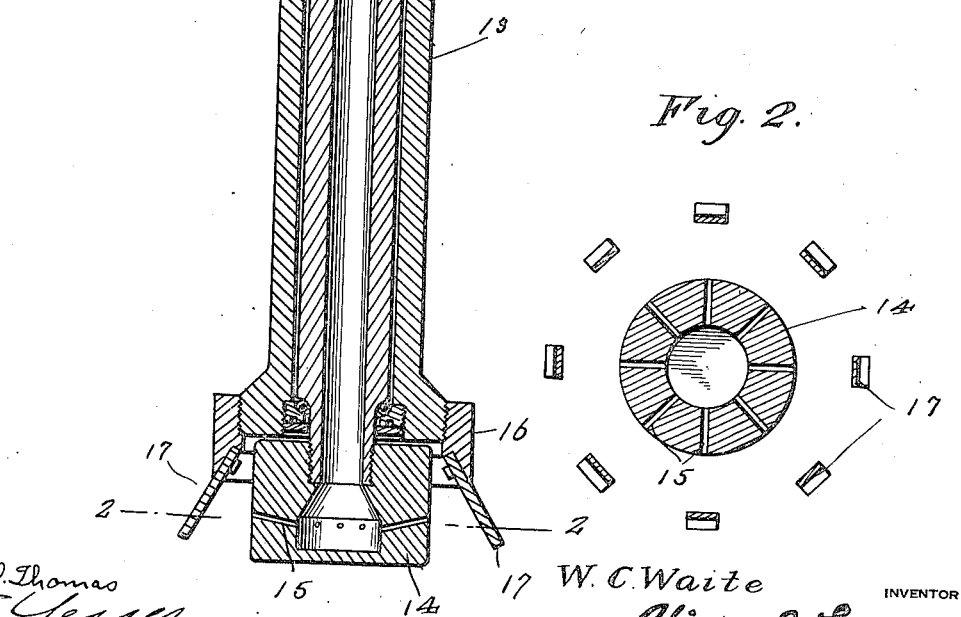
Fig. 2 is a sectional view taken on line 2—2 of Fig. 1.

The device forming the subject matter of my invention comprises a frame like supporting structure indicated at 10, and designed to provide suitable bearings 11 having the inner and outer shafts 12 and 13 respectively. Both of these shafts are hollow, the shaft 12 being coupled to the source of liquid to be converted into a spray, the liquid flowing through the hollow shaft 12 as will be readily understood. The shaft 12 is considerably longer than the shaft 13, projecting an appreciable distance above this shaft 13 and a slight distance below the corresponding extremity of the shaft 12. Carried by the lower end of the inner shaft 12 is a head 14 having radially disposed bore 15 through which the liquid is thrown outwardly by centrifugal force in the form of a spray. The shafts 12 and 13 may be rotated in any suitable manner, and in any suitable direction. Carried by the lower end of the outer shaft 13 is a wheel 16 equipped with a plurality of angularly disposed blades 17, which overlie the openings in the head 14, the liquid passing through the openings in said head incident to centrifugal force, striking the blades 17, the latter breaking the liquid into fine spray and directing the spray downwardly and outwardly. Both the head 14 of the shaft 12 and the wheel on the shaft 13 are detachably connected to their respective shafts so that they may be readily removed as the occasion requires. The sprays are then brought into contact with the heated air so that the moisture is evaporated and the solid constituent of the liquid extracted therefrom in the form of a powder. As above stated the shafts 12 and 13 may be rotated in any suitable manner, in the same direction or in opposite directions, and at the same or different speeds being found suitable for the purpose intended, by controlling the speeds with which the shaft rotates, the volume, fineness and the direction of the spray may be readily and easily obtained. The construction permits for proper control and increased flexibility of the spray which is a matter of importance when extracting the solid constituents from the liquid as above stated. Each of the shafts 12 and 13 respectively is equipped with a belt pulley 13'.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:

1. A spraying device of the character described comprising a supporting frame, a plurality of hollow shafts mounted on the frame for rotation, and arranged one within the other, a perforated head carried by the inner shaft, and blades carried by the outer shaft and surrounding said perforations of the head as and for the purpose specified.

2. A liquid spraying device of the character described comprising an inner and an outer hollow shaft, a supporting frame upon which the shafts are mounted for rotation, said inner shaft being adapted to be connected to the liquid supply, a perforated head detachably connected with the lower end of the inner shaft, a wheel detachably connected to the lower end of the outer shaft, and blades carried by the wheel and surrounding the perforations of the said head as and for the purpose specified.

In testimony whereof I affix my signature.

WARREN C. WAITE.